C. J. ZELVIS.
CHURN.
APPLICATION FILED JUNE 24, 1918.
1,296,899.
Patented Mar. 11, 1919.
Fig. 1.
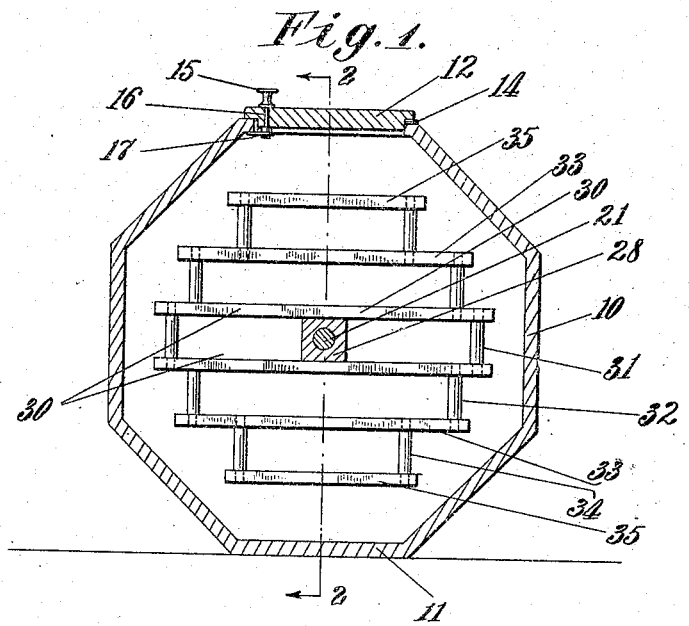
Fig. 2.
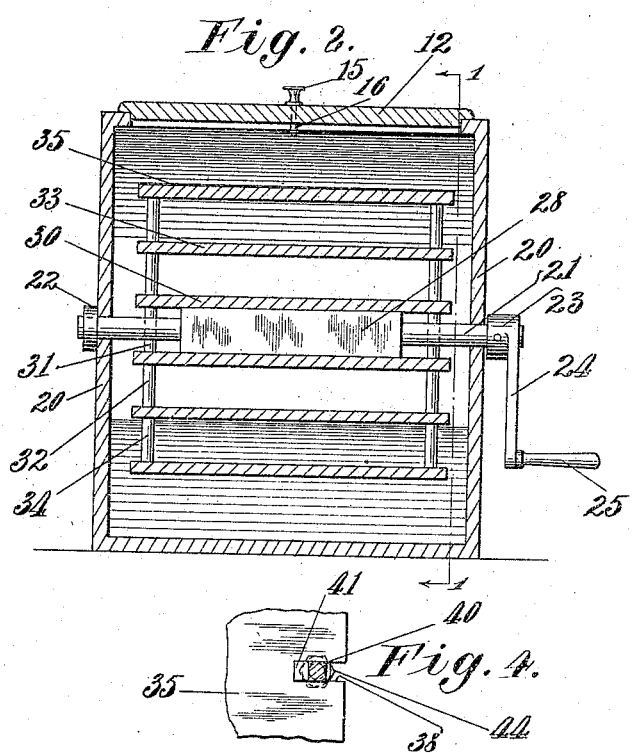
Fig. 3.
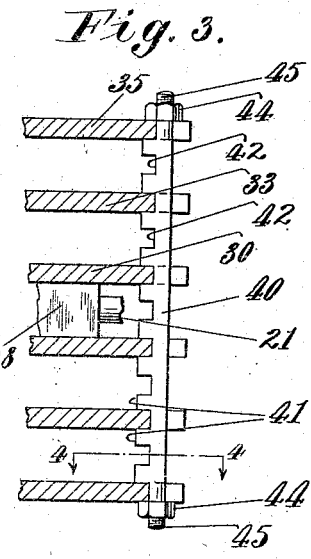
Fig. 4.
INVENTOR
Charles J. Zelvis.
BY Oscar Geier
his ATTORNEY

UNITED STATES PATENT OFFICE.

CHARLES J. ZELVIS, OF CLEVELAND, OHIO.

CHURN.

1,296,899.  Specification of Letters Patent.  Patented Mar. 11, 1919.

Application filed June 24, 1918. Serial No. 241,660.

*To all whom it may concern:*

Be it known that I, CHARLES J. ZELVIS, a citizen of Russia, residing at Cleveland, county of Cuyahoga, and State of Ohio, have invented certain new and useful Improvements in Churns, of which the following is a specification.

This invention relates to improvements in churns such as are used in dairies.

The principal object of the invention is to provide a churn having a novel form of beaters or paddle by which the action of churning the cream or other substance is performed in an expeditious and effective manner.

A further object is to provide a churn in which the paddles or blades may be increased or decreased in number easily and conveniently.

These and other like objects are attained by the novel construction and combination of parts hereinafter described and shown in the accompanying drawings, forming a material part of this disclosure, and in which:—

Figure 1 is a vertical sectional view, taken on line 1—1 of Fig. 2, of a churn made in accordance with the invention.

Fig. 2 is another vertical sectional view, taken on line 2—2 of Fig. 1.

Fig. 3 is a fragmentary sectional view, showing a modification in construction as to the manner of attaching the beater plates, and Fig. 4 is a fragmentary transverse sectional view taken on line 4—4 of Fig. 3.

Referring to the drawing, which show a polygonal casing 10, one of the lower sides 11 resting upon a table or other support, while in oppositely disposed sides is a cover plate 12, engaged by hinges 14 and provided at the opposite edge with an extending knob 15, engaged with a rod 16, to which is attached a button 17, engageable with the inturned edge of the next angular side of the apparatus.

Rotatably mounted in the sides 20 of the casing is a shaft 21, having a fixed collar 22 at one end and a hub 23 at the other, a crank 24 extending from the hub, furnished with an operating handle 25 by means of which the shaft may be rotated.

Fixed centrally on the shaft 21 is a rectangular block 28, and connected to opposite sides of the block are a pair of plates 30, the same being engaged near their ends by fixed posts 31, other posts 32 extending from their outer edges with which are engaged another pair of plates 33, other pairs of pins 34 connecting the outermost plates 35 so as to form an essentially rigid structure rotatable within the churn casing by actuating the extending handle 25.

In the form shown in Figs. 3 and 4, the several plates 30, 33 and 35, contain slots or recesses 38 at their ends engageable with a bar 40, and held in relative position, due to a plurality of raised lugs 41 formed upon the inner surface of the bar, presenting openings 42 between the lugs receptive of the ends of the plates, the other plates 35 being clamped to the bar by nuts 44, the same being fitted upon the extending ends 45 of the bars.

This construction permits of additional plates to be inserted if it be desired, whereby the cream or other substance to be churned may be more thoroughly beaten and mixed, the bars providing an adjustment as to number and position of the beater plates in an obvious manner.

Having thus described my invention what I claim as new and desire to secure by Letters Patent, is.

1. In a churn provided with a casing, the combination of a shaft journaled in the side elements of said casing, with a rectangular block fixed upon said shaft, a pair of plates rigidly engaged to said opposite sides of said blocks, opposed pairs of bars suited to recesses formed in the ends of said plates, a plurality of lugs formed upon the inner side of said bars, other plates engageable within the openings formed between said lugs, and means for clamping said bars with relation to the outermost of said plates.

2. In a churn provided with a casing, the combination of a shaft journaled transversely in said casing, extending through the side walls thereof, with a rectangular block secured centrally upon said shaft, a plurality of plates engaged upon opposite sides of said block, means for holding said plates in an adjustable spaced relation to said block, and means for rotating said shaft.

In testimony whereof I have affixed my signature.

CHARLES J. ZELVIS.

Copies of this patent may be obtained for five cents each, by addressing the "Commissioner of Patents Washington, D. C."